Aug. 21, 1951   A. C. PARINE   2,564,990
COMBINATION SAUSAGE STEAMER AND BUN WARMER
Filed Aug. 8, 1949   3 Sheets-Sheet 1
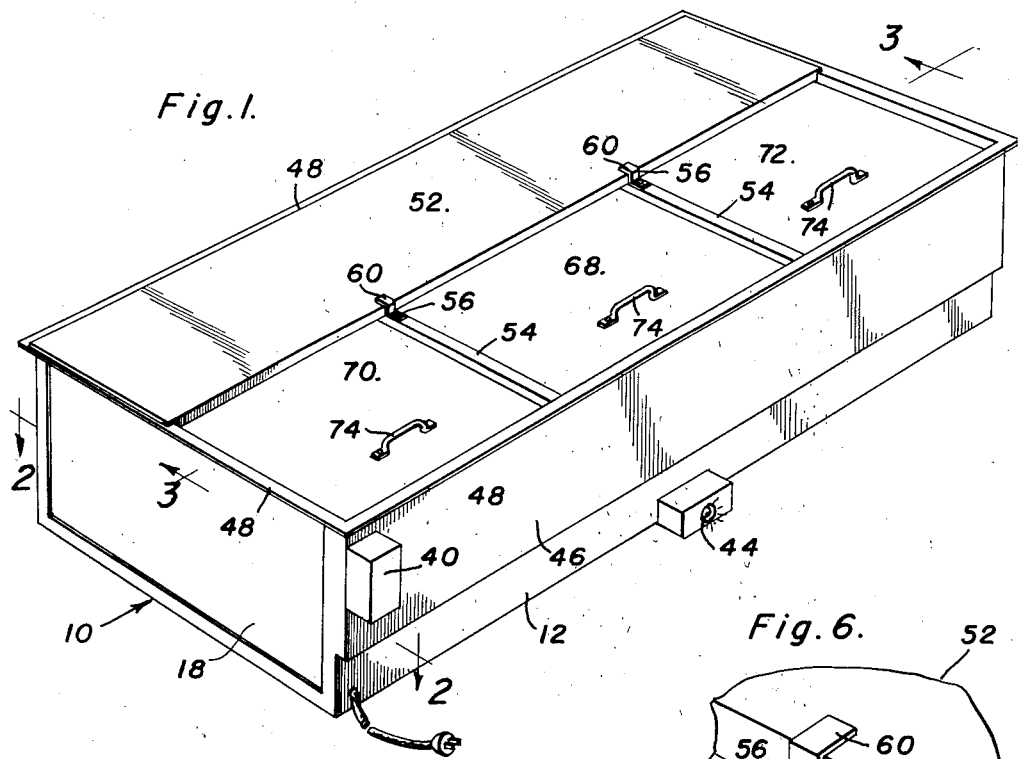
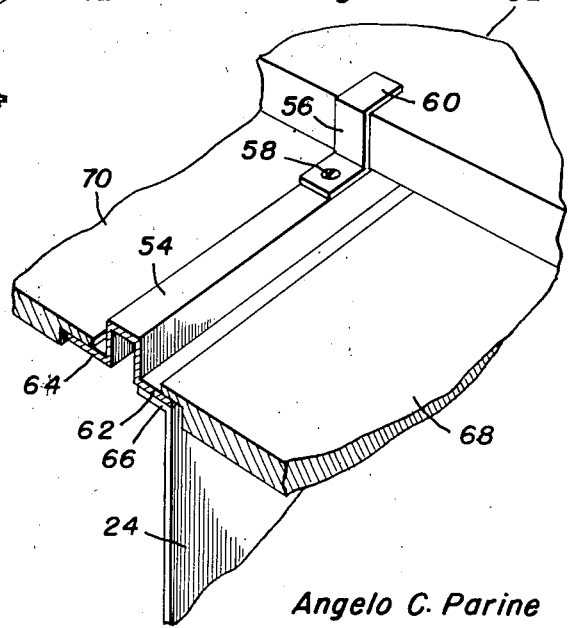
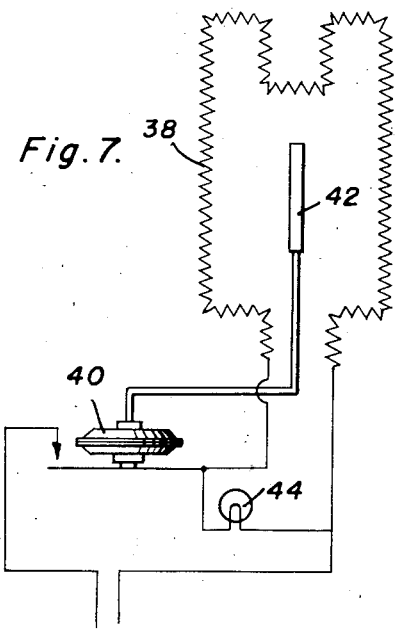
Angelo C. Parine
INVENTOR.

Aug. 21, 1951     A. C. PARINE     2,564,990
COMBINATION SAUSAGE STEAMER AND BUN WARMER
Filed Aug. 8, 1949     3 Sheets-Sheet 2
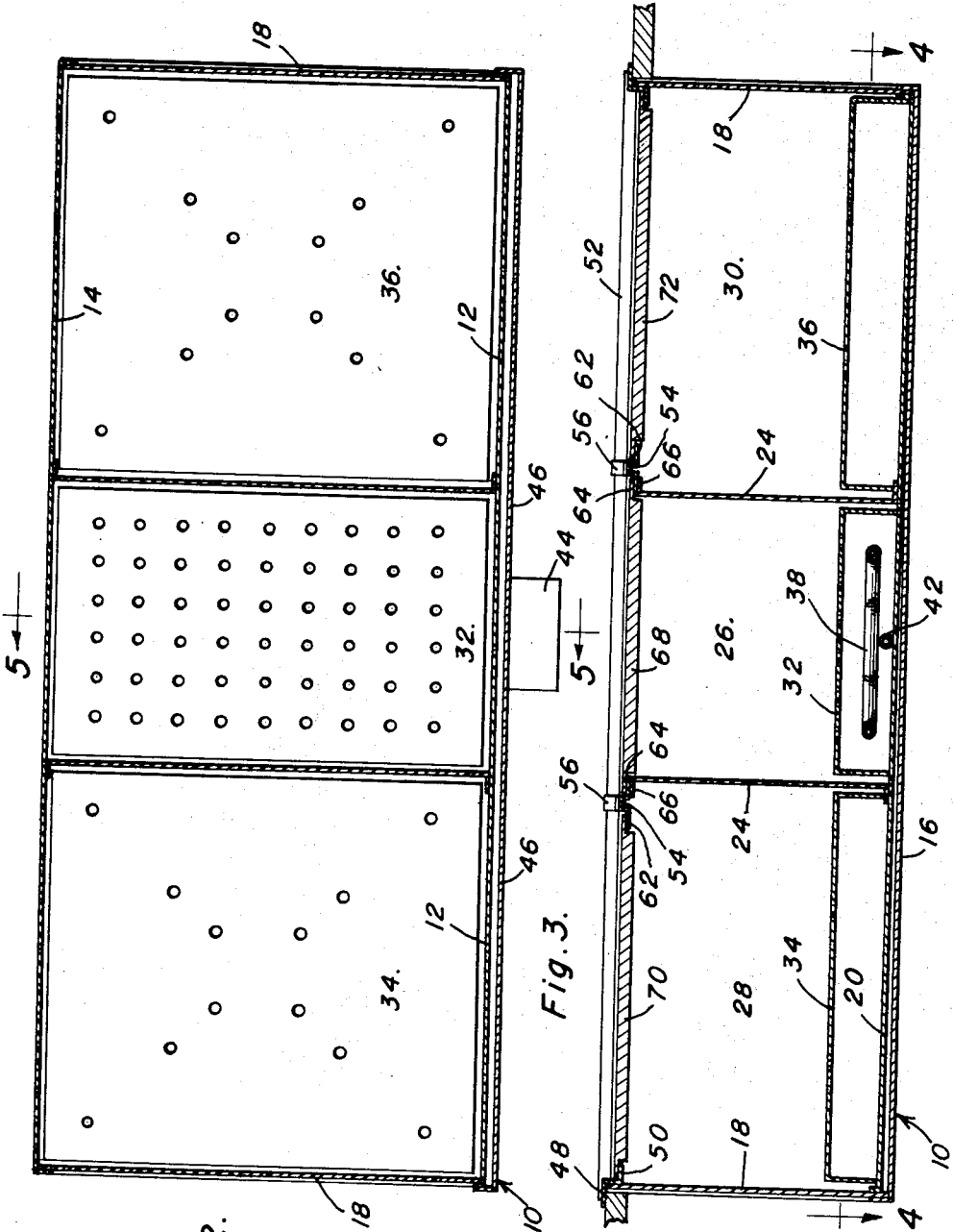
Angelo C. Parine
INVENTOR.

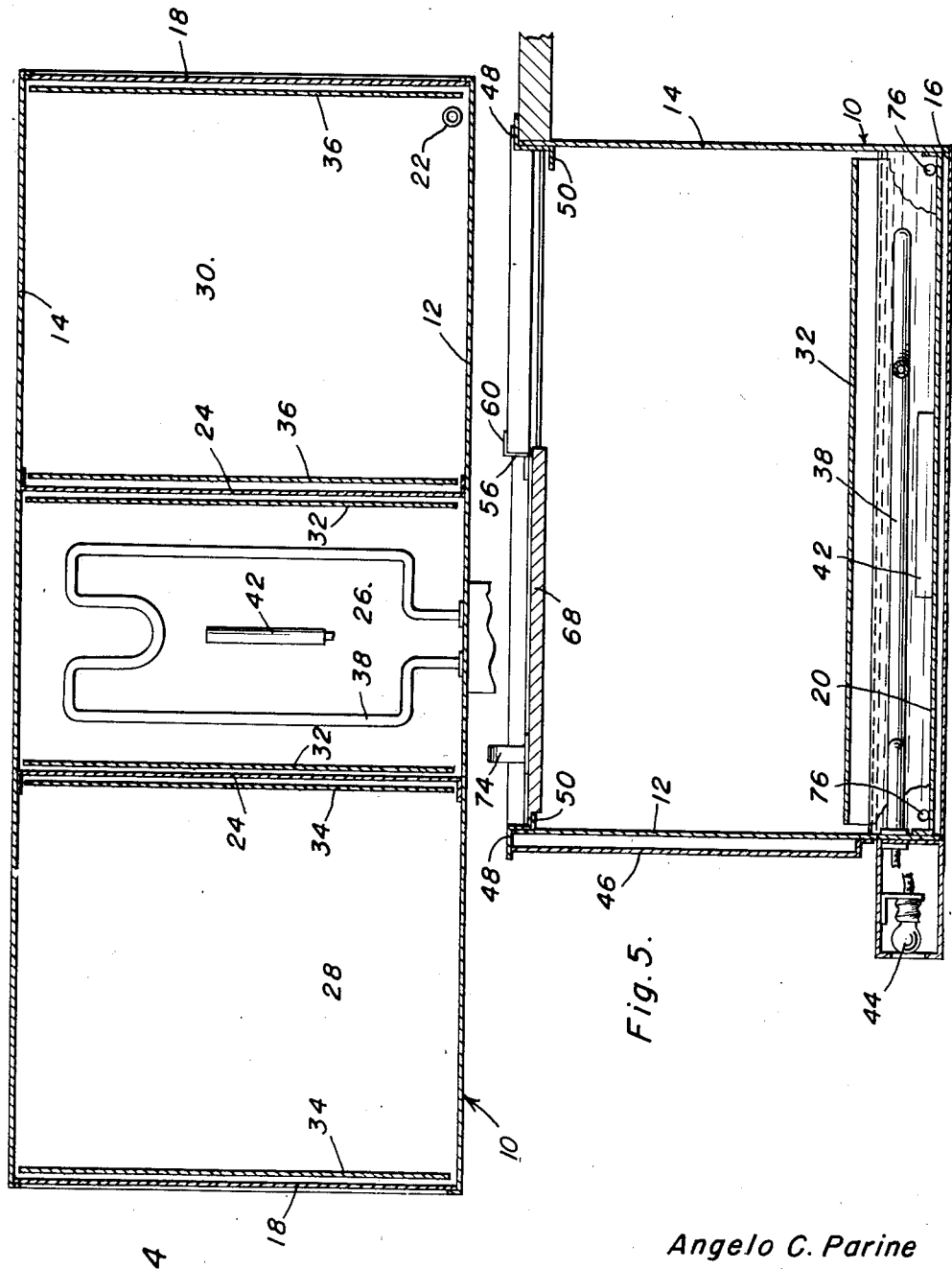

Patented Aug. 21, 1951

2,564,990

UNITED STATES PATENT OFFICE 2,564,990

COMBINATION SAUSAGE STEAMER AND BUN WARMER

Angelo C. Parine, Detroit, Mich.

Application August 8, 1949, Serial No. 109,093

6 Claims. (Cl. 219—19)

This invention relates to new and useful improvements in warmers for feedstuff and the primary object of the present invention is to provide a small and compact article for steaming sausages and warming buns.

Another important object of the present invention is to provide a combination sausage steamer and bun warmer composed of parts that are quickly and readily removed and replaced whereby the same may be conveniently cleaned and serviced.

Yet another object of the present invention is to provide a combination sausage steamer and bun warmer having a sloping bottom wall and a drain pipe leading from the low point of the bottom wall whereby the water employed for the steaming and warming of articles can be removed in a convenient manner.

A further object of the present invention is to provide a combination sausage steamer and bun warmer including a group of compartments that are so arranged with respect to a heater that one of the compartments will receive considerably more heat than the remainder of the compartments thereby permitting sausages to be placed in the compartment receiving the most heat and buns to be placed in the other compartments.

An outstanding feature of the present invention is the provision of a combined sausage steamer and bun warmer including a group of compartments, a slidable closure for each compartment and novel and improved guide means for the closures.

A still further aim of the present invention is to provide a combination sausage steamer and bun warmer that is simple and practical in construction, strong and reliable in use, neat and attractive in appearance, efficient and durable in operation, relatively inexpensive to manufacture, and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which:

Figure 1 is a perspective view of the present invention;

Figure 2 is a longitudinal horizontal sectional view taken substantially on a plane of section line 2—2 of Figure 1;

Figure 3 is a longitudinal vertical sectional view taken substantially on the plane of section line 3—3 of Figure 1;

Figure 4 is a view similar to Figure 2 but showing the perforated supports removed;

Figure 5 is an enlarged transverse vertical sectional view taken substantially on the plane of section line 5—5 of Figure 2;

Figure 6 is a perspective view showing in detail the guide means for the sliding closures; and Figure 7 is a schematic view showing the electrical circuit used in the present invention.

Referring now to the drawings in detail, wherein for the purpose of illustration, there is disclosed a preferred embodiment of the present invention, the numeral 10 represents an elongated substantially rectangular housing, of preferably metallic construction including a forward wall 12, a rear wall 14, a lower wall 16 and end walls 18. An elongated bottom 20 is provided with a marginal flange that is suitably secured to the walls 12, 14 and 18, and the wall 20 slopes downwardly from one end wall of the housing to the other end wall of the housing for drainage purposes.

The low point of the wall 20 is provided with an outlet opening from which there depends a drain pipe 22 having a suitable closure plug or cap (not shown) that is quickly removed from the pipe 22 for draining water from the housing 10.

A pair of spaced parallel partitions 24 are secured to and rise from the wall 20 to divide the housing 10 into a central compartment 26 and end compartments 28 and 30. Inverted channel shaped supports or pans 32, 34 and 36 are placed in the compartments 26, 28 and 30. The web portions of the supports 32, 34 and 36 are provided with perforations and the support 32 is provided with approximately four times as many perforations per unit area as the supports 34 and 36, for a purpose which will later be more fully described.

An immersion type electrically operated heater 38 is mounted on the forward wall 12 and is disposed within the central compartment 26 beneath the web portion of the support 32. The heater 38 is electrically connected to a thermostatic control 40 having a portion 42 disposed in the compartment 26 below the heater and the thermostatic control is electrically connected to a pilot or signal light 44 disposed on the forward wall 12. The thermostatic control 40 is preferably of the type being manufactured under the trade name "Chromalox Thermostat" and the control 40 is mounted on a support wall 46 carried by the forward wall 12.

The upper edges of the walls 12, 14 and 18 receive angle iron members 48 the vertical leg portions of which rest against the inner faces of the walls 12, 14 and 18 and are secured to horizontally disposed flanges 50. The reduced side edges and rear edge of an upper wall 52 are supported upon the flanges 50 of the angle iron members on the end walls 18 and rear wall 14 and the forward edge of the upper wall 52 is spaced rearwardly of the forward wall 12 to provide access openings into each of the compartments.

Elongated, inverted, channel shaped guide members 54 are terminally secured to the walls 12 and 14. The shorter legs of L-shaped brackets or hooks 56 are removably secured to the web portions of the members 54 by fasteners or the like 58 and the longer legs of the brackets 56 bear against the forward edge of the upper wall 52. Rearwardly extending horizontal flanges or extensions 60 formed with the longer legs of the brackets 56 rest upon the upper face of the wall 52 to brace the members 54, intermediate their ends to the upper wall 52.

The leg portions of the members 54 are turned outwardly to provide inner and outer horizontal flanges 62 and 64. The inner flanges 62 rest upon and are suitably secured to the out-turned flanges 66 at the upper edges of the partitions 24.

Closures 68, 70 and 72 are provided for the compartments 26, 28 and 30. The reduced side edges of the closure 68 are slidably received upon the inner flanges 62 of both members 54 and the forward and rear edges of the closure 68 are also undercut or reduced so that the same can be supported upon the flange 50 of the member 48 on the forward wall 12 or the flange 50 of the member 48 on the rear wall 14, depending on whether the closure 68 is in its closed or open position.

The side edges of the closures 70 and 72 are also reduced to slidably engage the flanges 64 of the members 54 and the flanges 50 of the members 48 on the end walls 18. The forward and rear edges of the closures 70 and 72 are likewise reduced to selectively overlie the flanges 50 of the members 48 on the forward wall 12 and rear wall 14. Each of the closures 68, 70 and 72 is provided with a hand grip 74.

In practical use of the present invention, sausages are placed on the support 32, and/or buns and sausages are placed on the supports 34 and 36. As the support 32 is formed with a greater number of perforations than the supports 34 and 36, the sausages on the support 32 will be subjected to more steam than the articles on the supports 34 and 36. The sausages will be ready to serve in from eight to twelve minutes.

The buns are steamed at the same time, only they receive just enough steam to make them very soft yet not soggy. This is accomplished by circulating water and steam through the openings 76 at the lower corners of the partitions 24 (see Figure 5).

The doors or closures, supports and all walls are quickly and readily assembled or disassembled for convenient cleaning.

When the temperature of the water has reached a predetermined degree, the control 40 will de-energize the circuit to the heater and the light 44 will be de-activated to indicate the sausages and buns are ready to be served.

In view of the foregoing description taken in conjunction with the accompanying drawings it is believed that a clear understanding of the device will be quite apparent to those skilled in this art. A more detailed description is accordingly deemed unnecessary.

It is to be understood, however, that even though there is herein shown and described a preferred embodiment of the invention the same is susceptible to certain changes fully comprehended by the spirit of the invention as herein described and the scope of the appended claims.

Having described the invention, what is claimed as new is:

1. A combination sausage steamer and bun warmer comprising a housing having partitions therein dividing the housing into a central compartment and a pair of end compartments, an immersion type electric heater mounted in the central compartment and submerged in a liquid placed in the central compartment, a perforated support in each of the compartments, the support in the central compartment having a greater number of perforations per unit area than the supports in the end compartments so that sausages placed in the central compartment will receive a greater amount of heat emitted from the heater than buns placed in the end compartments, and a closure for each of the compartments, said housing including a bottom wall sloping downwardly toward one end of the housing for drainage, and a drain pipe depending from the low point of said bottom wall.

2. A combination sausage steamer and bun warmer comprising a housing having partitions therein dividing the housing into a central compartment and a pair of end compartments, an immersion type electric heater mounted in the central compartment and submerged in a liquid placed in the central compartment, a perforated support in each of the compartments, the support in the central compartment having a greater number of perforations per unit area than the supports in the end compartments so that sausages placed in the central compartment will receive a greater amount of heat emitted from the heater than buns placed in the end compartments, said housing having an upper wall overlying a portion of each of said compartments, guides overlying said partitions, means supporting the guides beneath the upper wall, and closures for the compartments slidably carried by said guides.

3. The combination of claim 2 wherein said guides include elongated channel members having web portions and leg portions, and horizontal extensions on the leg portions of said guides supporting said closures.

4. The combination of claim 2 wherein said means includes hook members secured to said guides and having portions overlying said upper wall.

5. A combination sausage steamer and bun warmer comprising a housing having a partition therein dividing the housing into two compartments, an immersion type electric heater mounted within one of said compartments and submerged in a liquid placed in said one of said compartments, a perforated support in each of the compartments, the support in said one of said compartments overlying the heater and having a greater number of perforations per unit area than the support in the other compartment, said compartments including forward and rear end portions, said housing having an upper wall overlying the rear end portions of said compartments, guide means supported beneath said upper wall, and closures for the compartments slidably carried by the guide means.

6. A combination sausage steamer and bun warmer comprising a housing having a partition therein dividing the housing into two compartments, an immersion type electric heater mounted within one of said compartments and submerged in a liquid placed in said one of said compartments, a perforated support in each of the compartments, the support in said one of said compartments overlying the heater and having a greater number of perforations per unit area than the support in the other compartment, and closures for the compartments.

ANGELO C. PARINE.

REFERENCES CITED

The following references are of record in the file of this patent:

UNITED STATES PATENTS

| Number | Name | Date |
| --- | --- | --- |
| 1,505,299 | Stirn | Aug. 19, 1924 |
| 1,850,193 | Zahner | Mar. 22, 1932 |
| 2,053,935 | Austin | Sept. 8, 1936 |
| 2,196,035 | Shaw | Apr. 2, 1940 |
| 2,251,582 | White | Aug. 5, 1941 |
| 2,481,334 | Blackwell | Sept. 6, 1949 |